INVENTORS
JOHN HALAHAN
THEODORE F. ARONSON
FLOYD A. LYON

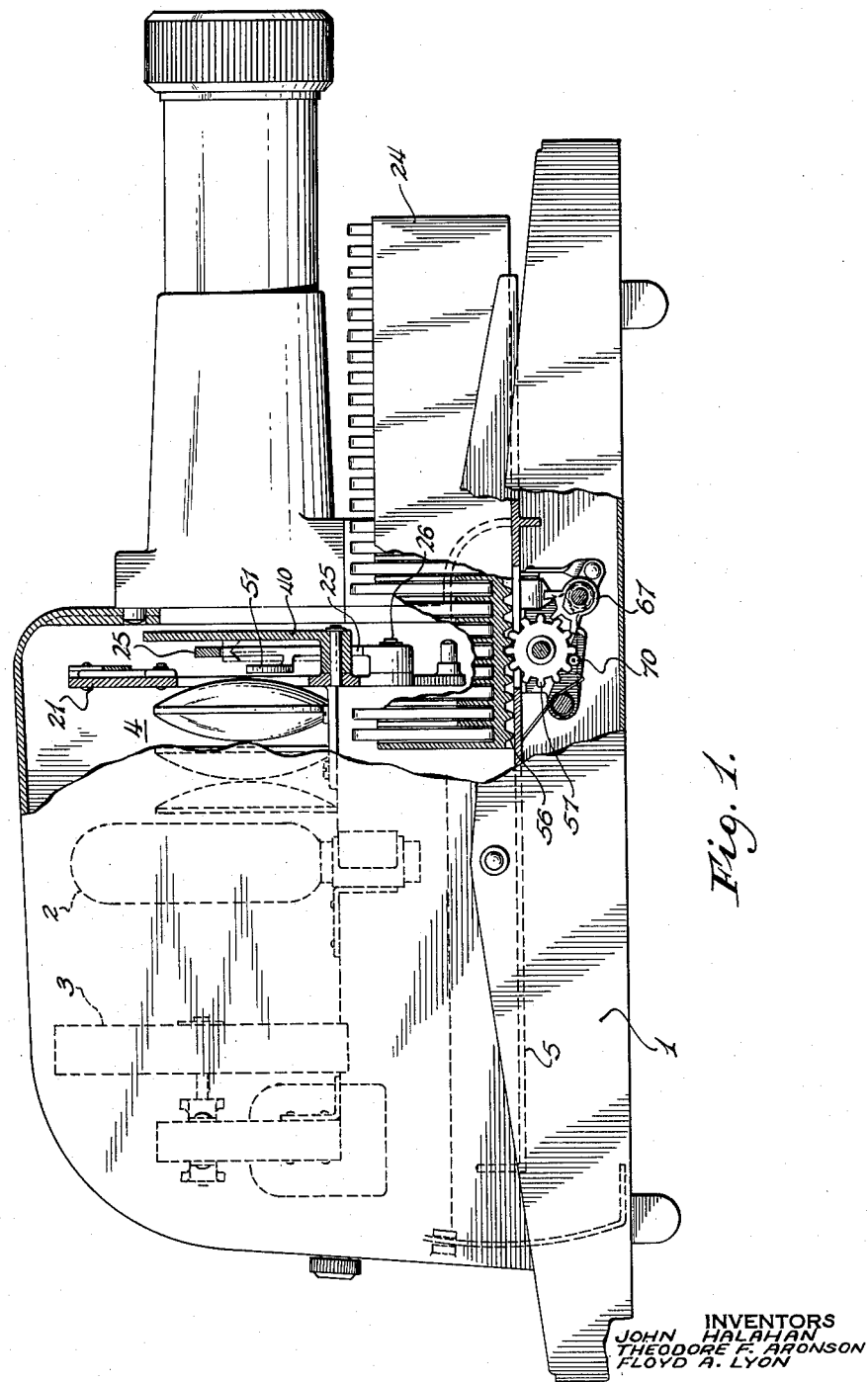

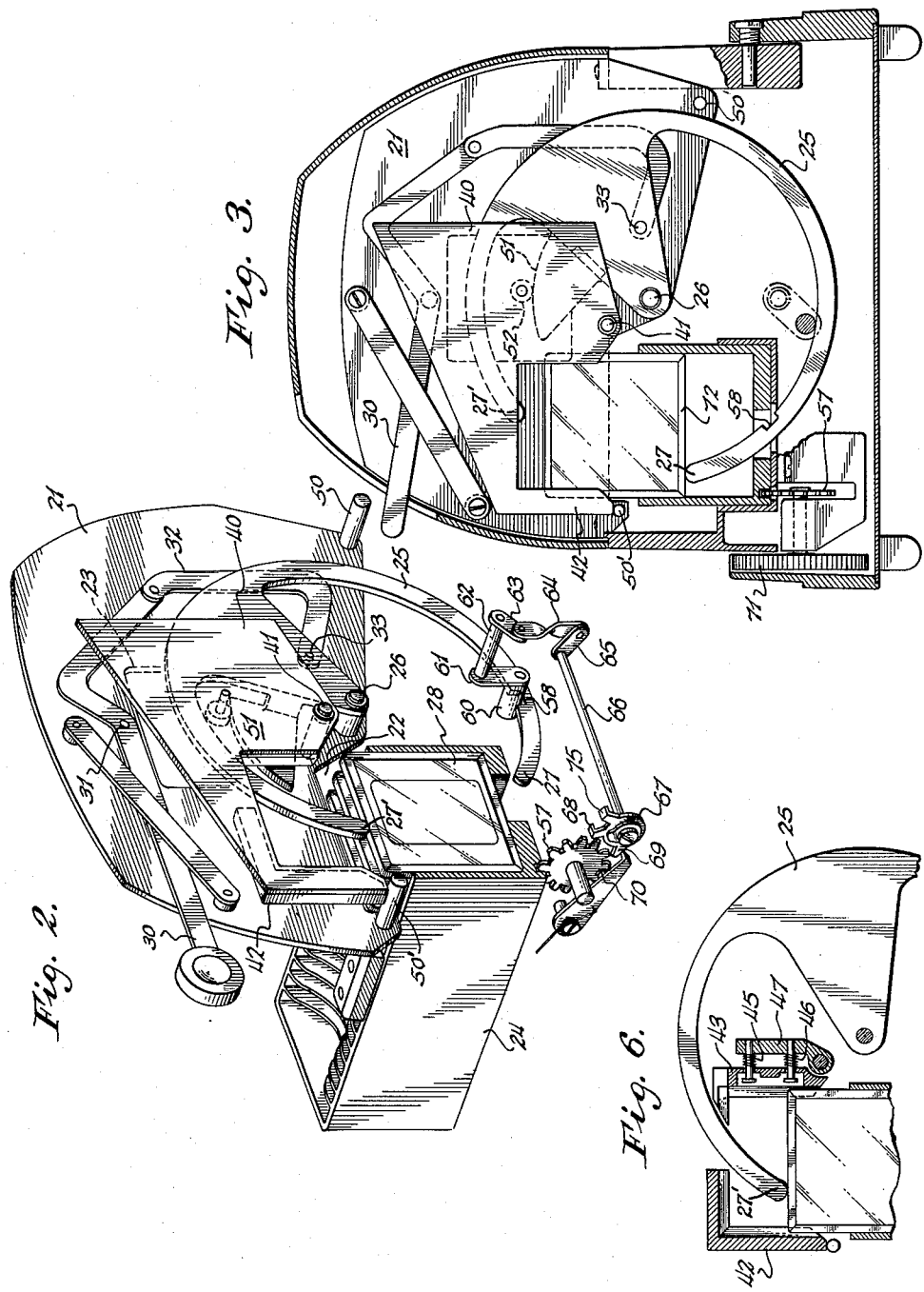
INVENTORS
JOHN HALAHAN
THEODORE F. ARONSON
FLOYD A. LYON

United States Patent Office

2,984,151
Patented May 16, 1961

2,984,151

SLIDE CHANGING MEANS FOR PROJECTORS

John Halahan, Brookville, Theodore F. Aronson, Valley Stream, and Floyd A. Lyon, Brookville, N.Y., assignors to Viewlex, Inc., Long Island City, N.Y., a corporation of New York Filed Mar. 1, 1954, Ser. No. 413,262

6 Claims. (Cl. 88—28)

This invention relates to slide changing means for projectors, and more particularly to such means adapted to advance a magazine holding a number of slides.

Manual slide changing apparatus generally comprises a slide holder or carrier into which a slide is inserted by hand and then slid in front of the projector light beam. In using the manual type apparatus each slide must be separately handled at least twice. This results in undue wear and tear on the slides and causes the slides to be projected occasionally upside down or reversed. Also the slides are apt to become lost or to follow in the wrong order and proper presentation. This is important when the slides are presented in connection with a lecture. Such an occurrence during a lecture breaks up the continuity and distracts the audience and greatly detracts from the presentation.

The present invention solves these difficulties by providing a magazine for holding a convenient number of slides, which is adapted to be advanced as each slide is viewed. The magazine is inserted in the projector and the slides are picked up by a lifting mechanism from the magazine in the proper order, viewed, and then returned to the magazine. The magazine is automatically advanced before each slide is picked up from it. When the group of slides is finished, the magazine is removed from the projector and the slides may be permanently stored in the magazine. This invention minimizes wear and tear on the slides and eliminates any confusion with the slides caused by misplacing or losing them. In the present invention, the slides are not manually handled at all once they are placed in the magazine.

Accordingly, a principal object of the invention is to provide new and improved slide changing means for projectors.

Another object of the invention is to provide new and improved slide changing means, utilizing a slide holding magazine.

Another object of the invention is to provide slide handling changing means which eliminate manual handling.

Another object of the invention includes a slide magazine, means to advance the magazine, and means to pick the slide up from the magazine and put them in viewing position.

Another object of the invention is to provide means for changing the slides, comprising a support plate member, a slide magazine adapted to be mounted on said plate, an open ring member pivoted on said plate, and adapted to pick up said slide from said magazine, and means to advance the magazine each time a slide is picked up.

These and other objects of the invention will be apparent from the following specification and drawings of which:

Figure 1 is a side view partially in section of a projector, utilizing the invention.

Figure 2 is a perspective view of an embodiment of the invention.

Figures 3, 4 and 5 are elevation views of the invention showing the sequence of the operation.

Figure 6 is a detail view of an embodiment of the invention.

Figure 4:
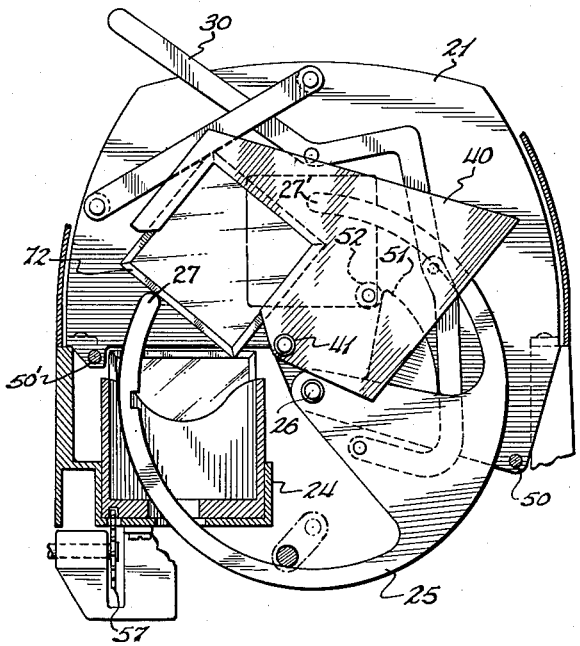

Figure 1 shows a projector embodying the invention. The projector has conventional base 1, projector lamp 2, fan 3 and lens system 4. A slide magazine 24 is inserted on track 5. The magazine has teeth 56 on its bottom surface which are adapted to be engaged by the gear 57 to advance the slide magazine so that successive slides may be viewed.

The slides are adapted to be picked up from the magazine and placed in viewing position by slide handling means which will be discussed hereafter. The gear 57 is adapted to be actuated by a pawl. The pawl is actuated by the slide handling mechanism as will be explained.

Referring to Figures 2, 3, 4 and 5, the invention comprises a supporting plate 21 which has two openings 22 and 23. The first notch opening 22 is adapted to accommodate a slide magazine 24 and the second viewing opening or aperture 23 is adapted to permit light to be projected through the plate when a slide is in viewing position. An open ring member 25 is pivotally mounted on the supporting plate at 26. The bottom prong 27 of the open ring member is adapted to extend through the bottom of the slide magazine 24 so that when the ring member rotates clockwise, a slide 28 is picked up and raised.

The ring member 25 is operated by the handle 30 which extends outside the case and is pivotally mounted on the supporting plate at 31 and pivotally connected to the connecting member 32. The connecting member 32 is pivotally connected at its other end to the open ring member at the point 33.

A shutter plate 40 is pivotally connected to the supporting plate at 41. The shutter plate contains slide positioning members 42 and 43, Figure 6. The slide positioning member 43 is spring loaded by the springs 45 and 46, which force the member 43 away from its mounting member 47 which is mounted on the shutter plate 40. The holder 43 is mounted on the member 47 by two pins upon which the springs are mounted. The slide holders have a V section to center the slides.

Therefore, when the open ring member 25 is rotated clockwise, the slide is raised vertically until it contacts the top of slide positioning member 42 whereupon further rotation of the ring member rotates the entire shutter plate assembly until the slide is positioned in front of the viewing aperture in the supporting plate, in viewing position. This position is indexed by means of the indexing pin 50, which stops the shutter plate 40 in the proper position. The top of slide positioning member 42 has a diagonal slot cut through it so that the upper end of the open ring member can slide through it. The cam 51 is mounted on the open ring member 25 and bears against the roller 52 which is mounted on a pin connected to the shutter plate 40.

One purpose of the cam and cam follower is to keep the shutter plate 40 from rotation until the slide is raised vertically. This is to prevent jamming of the slide between the slide positioning members 42 and 43 which would occur if the plate 40 rotated before the slide was positioned against the top of the slide positioning member 42. The cam 51 also actuates the return of shutter plate 40.

The slide magazine indexing mechanism is as follows: The slide magazine 24 is of a conventional type which is adapted to hold a number of slides. The magazine has teeth 56, Figure 1, cut in its bottom surface so that the magazine may be advanced by a rack and pinion arrangement wherein the teeth cut in the bottom of the magazine form the rack and the gear 57 forms the pinion.

The gear 57 is operatively connected to the open ring member 25 by a linkage comprising the following members shown in Figure 2. The open ring member 25 has a notch 58 cut near its lower end. The notch is adapted to engage the roller 60 mounted on the member 61 which is pivotally mounted on the base by means of an axle 62 to which it is fixedly connected. On the other end of the axle 62 is a link member 63 which is fixedly connected thereto. On the other end of the link member 63 is pivotally connected a twisted link member 64 which is pivotally connected at its other end to another link member 65. The link member 65 is fixedly connected to the shaft 66 which is journaled to the mounting base. On the other end of the shaft 66 is a pawl member 67 having a tooth 68 cut at an angle so that it will advance the gear 57 one notch for each rotation of the open ring member 25. The arm 69 on member 67 is adapted to release the detent 70 as the pawl 68 moves gear 57, and arm 75 is a stop which contacts the next tooth of gear 57. The pawl member 67 is preferably mounted on its shaft with a spring washer to provide sufficient end play. The spring loaded detent member 70 is adapted to index the gear 57 and therefore, the slide magazine. The tooth of the pawl 68 is cut at an angle and the pawl 68 is mounted on shaft 66 with a spring washer which has sufficient end play so that on the return stroke the angled tooth will slide over the teeth of the gear 67 which is held in position by the detent 70.

The operation of the magazine advancing means is as follows: The roller 60 normally rests in the notch in the open ring member, therefore, when the open ring member 25 is rotated, the roller 60 is lifted thereby actuating the linkages 61, 62, 63, 64, 65, 66 and 67, to advance the gear 57 and thereby advance the slide magazine 24 to the next slide position. This is done before the ring member contacts the slide and lifts it. The pawl is normally disengaged from gear 57 to permit manual operation of the magazine.

Knob 71 is provided for manually advancing the magazine.

Figure 5:
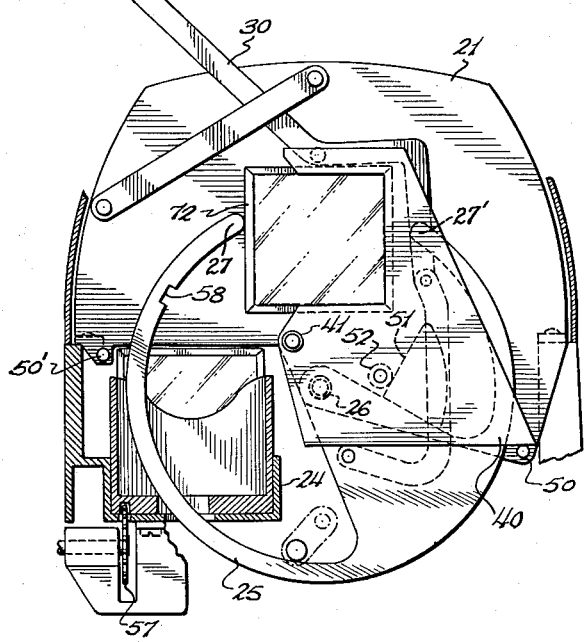

Referring more specifically to Figures 3, 4 and 5, the sequence of operation is shown.

In Figure 3, the slide 72 has just been picked up by the ring member 25 and has been moved vertically upward. The cam 51, attached to the ring member bears against the roller 52, which is mounted on the shutter plate 40, thereby preventing the shutter plate from rotating at this time. The shutter plate will not rotate until the slide has reached its full vertical travel and has engaged the slide holder 42. At that point, the force of the slide against the slide holder 42 will cause the shutter plate to rotate. The purpose of the cam 51, is to prevent premature rotation of the shutter plate which would cause the slide 70 to jam in the slide holders 42, 43.

Figure 4 shows the shutter plate 40 rotated about halfway to the viewing position, and Figure 5 shows the shutter plate and slide in viewing position. This position is indexed by the lower right hand corner of the shutter plate 40 resting against the stop 50, which is mounted on the main support plate. Note that the roller 52 has run down the other side of the cam 51. On the return stroke, the cam 51 bears against the roller 52, thereby causing the shutter plate 40 to rotate counterclockwise to its original position. The slide will then drop back into the magazine and the apparatus will be ready for another cycle. With respect to the operation of the cam 51, its purpose is to hold the slide carrier 40 steady as the pusher member pushes the slide up into the slide holder on the carrier. The curved portion of cam 51 is concentric with pivot 26, which is offset from pivot 41 to provide a locking action via roller 52 on the slide carrier 40. If this definite means was not provided, the slide carrier 40 might be prematurely rotated due to the friction between it and the slide being pushed which might cause a binding of the slide. Figure 3 illustrates how the cam 51 exerts a force counterclockwise around the pivot point 41 of the carrier 40. When the slide is fully seated, the roller 52 will be at the apex of the cam 51.

The slot 58 and the ring member will trip the roller 60 of the indexing linkage shown in Figure 2, thereby advancing the magazine one slide position. The shutter plate 40 cuts off the light beam when the slide is not in viewing position.

We claim:

1. Slide changing means for projectors comprising a slide magazine, a supporting plate member having an opening adapted to accommodate said slide magazine and a second opening at slide viewing position, an open ring member pivotally mounted on said supporting plate, said ring member being adapted to move a slide from a position adjacent said first aperture to a position adjacent said second aperture, a shutter plate member pivotally mounted on said supporting plate, slide holding means mounted on said shutter plate, a cam mounted on said open ring member, a cam follower for said cam mounted on said shutter plate, indexing means for advancing a slide magazine relative to said ring member said indexing means being connected to and actuated by said open ring member.

2. Slide changing means for projectors comprising a slide magazine, a supporting plate member having an opening adapted to accommodate said slide magazine and a second opening at slide viewing position, an open ring member pivotally mounted on said supporting plate, said ring member being adapted to move a slide from a position adjacent said first aperture to a position adjacent said second aperture, a shutter plate member pivotally mounted on said supporting plate, slide holding means mounted on said shutter plate, and means to prevent jamming of a slide in said slide holding means comprising a cam mounted on said open ring member, a cam follower for said cam mounted on said shutter plate, whereby said shutter is held stationary until said slide is seated properly.

3. Slide changing means for projectors comprising a slide magazine, a supporting plate member having an opening adapted to accommodate said slide magazine and a second opening at slide viewing position, an open ring member pivotally mounted on said supporting plate, said ring member being adapted to move a slide from a position adjacent said first aperture to a position adjacent said second aperture, a shutter plate member pivotally mounted on said supporting plate, slide holding means mounted on said shutter plate, means to prevent jamming of a slide in said slide holding means comprising a cam mounted on said open ring member, a cam follower for said cam mounted on said shutter plate, whereby said shutter is held stationary until said slide is seated properly, and indexing means for advancing a slide magazine relative to said ring member, said indexing means being connected to and actuated by said open ring member, said indexing means being normally disengaged whereby said slide magazine may be then manually advanced.

4. Slide changing means for projectors comprising slide magazine mounting means, a supporting plate member adapted to accommodate said slide magazine mounting means and having a projection opening, curved pusher means pivotally mounted in a plane perpendicular to the longitudinal axis of said slide magazine mounting means adjacent said supporting plate, a carrier member pivotally mounted in a plane perpendicular to said axis of said slide magazine mounting means, slide holding means mounted on said carrier member, said pusher member being positioned relative said slide holding means to move a slide from said magazine position into said slide holding means, said carrier member being positioned relative said pusher member to transport a slide to projection position, and indexing means for advancing a slide magazine, said indexing means being connected to and actuated by said pusher member.

5. In a projector of the type accommodating removable slide magazines, slide changing means comprising movable slide magazine mounting means, a slide pusher member pivotally mounted in a plane perpendicular to the longitudinal axis of said slide magazine mounting means, carrier means pivotally mounted in a plane perpendicular to the axis of said slide magazine mounting means, slide holding means mounted on said carrier means and adapted to receive a slide from said pusher member, said carrier member being adapted to rotate a slide 90°, and place it in projection position.

6. Slide changing means for projectors of the type using movable slide magazines, comprising slide magazine mounting means, slide pusher means pivotally mounted adjacent said magazine mounting means, a slide carrier member pivotally mounted adjacent said pusher member, said pusher and slide carrier members being adapted to move a slide from said magazine position to a projection position, return pusher means connected with said slide pusher means, a cam mounted on said return pusher means, cam follower means mounted on said slide carrier means, and indexing means for advancing a slide magazine, said indexing means being connected to and actuated by said curved pusher member to change slides.

References Cited in the file of this patent

UNITED STATES PATENTS

| | | |
|---|---|---|
| 757,737 | Green et al. | Apr. 19, 1904 |
| 775,963 | Bentzon | Nov. 29, 1904 |
| 998,305 | Roebuck | July 18, 1911 |
| 1,402,791 | Petherick | Jan. 10, 1922 |
| 1,473,913 | McNair et al. | Nov. 13, 1923 |
| 2,093,746 | White et al. | Sept. 21, 1937 |
| 2,221,753 | Bodie | Nov. 19, 1940 |
| 2,293,408 | Schwannhausser | Aug. 18, 1942 |
| 2,590,492 | Bennett et al. | Mar. 25, 1952 |
| 2,613,574 | Moss | Oct. 14, 1952 |
| 2,756,630 | Goldberg | July 31, 1956 |

FOREIGN PATENTS

| | | |
|---|---|---|
| 747,066 | Germany | Sept. 6, 1944 |
| 1,061,808 | France | Dec. 2, 1953 |